United States Patent
Loafman

(10) Patent No.: US 7,085,888 B2
(45) Date of Patent: Aug. 1, 2006

(54) INCREASING MEMORY LOCALITY OF FILESYSTEM SYNCHRONIZATION OPERATIONS

(75) Inventor: Zachary Merlynn Loafman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 10/682,409

(22) Filed: Oct. 9, 2003

(65) Prior Publication Data
US 2005/0080996 A1 Apr. 14, 2005

(51) Int. Cl.
*G06F 12/00* (2006.01)

(52) U.S. Cl. ...................................... 711/129; 711/134

(58) Field of Classification Search ................ 711/118, 711/129–130, 133–136, 141, 147–148, 159–160
See application file for complete search history.

(56) References Cited

U.S. PATENT DOCUMENTS

| 5,357,623 | A | * | 10/1994 | Megory-Cohen | ............ 711/129 |
| 5,410,663 | A | | 4/1995 | Blackburn et al. | |
| 5,875,461 | A | * | 2/1999 | Lindholm | .................... 711/118 |
| 6,223,256 | B1 | * | 4/2001 | Gaither | ........................ 711/134 |
| 6,370,622 | B1 | * | 4/2002 | Chiou et al. | ................. 711/146 |

* cited by examiner

*Primary Examiner*—Nasser Moazzami
*Assistant Examiner*—Everett Williams
(74) *Attorney, Agent, or Firm*—Duke W. Yee; Marilyn Smith Dawkins; Gerald H. Glanzman

(57) ABSTRACT

A cache class in a software-administered cache of a multi-processor is assigned cache space that is localized to a single region of a memory and is contiguous. Synchronization and LRU operations can step sequentially through the given region, removing the need for SLB searches or the penalty for a miss, while other threads remain random access. The threads that manage each virtual memory area can then be attached to specific processors, maintaining physical locality as well.

14 Claims, 4 Drawing Sheets

INCREASING MEMORY LOCALITY OF FILESYSTEM SYNCHRONIZATION OPERATIONS

BACKGROUND OF THE INVENTION

1. Technical Field

This application relates generally to increasing performance in a multiprocessor system. More specifically, the application relates to speeding up synchronization and least recently used (LRU) operations on a multiprocessor system. More specifically still, the application relates to increasing the speed of these operations by improving the locality of file systems involved in these operations.

2. Description of Related Art

Cache

A cache, as defined in the dictionary is simply "a secure place of storage". As used in the computer industry, a cache has come to mean the fast memory in which pages of information are temporarily stored for quick retrieval by the system. This type of cache, which is used for increasing the virtual memory of a system, is generally managed by the hardware and its use is transparent to the operating system. There is, however, another type of cache, which is administered by software, such as the operating system of a computer. The operating system needs to access a number of objects such as inodes and metadata, which are pieces of information that provide information about files and exactly where to find them. Since the operating system needs to keep this metadata accessible, it will have a cache of metadata, which the operating system itself will administer. However, like main cache memory, the cache administered by the operating system is limited in space, so that old metadata must be periodically flushed out to make way for new metadata. Rather than try to search the entire operating system cache when space must be found, the cache can be separated into a number of cache classes. Each cache class will be associated with the metadata for a specific set of objects and will be allocated a given amount of cache space. This space will be allocated to the cache class in "pages" of a given size, although these are not the same as the pages used by the hardware to administer virtual memory. When a page in the software-administered cache must be freed for new metadata, only the pages belonging to the appropriate cache class are searched, not the entire cache.

While a number of algorithms can be used to decide which page is to be replaced at any given time, a commonly used method is one of the forms of the least recently used (LRU) algorithm. Using this algorithm, every time a packet of information is accessed, its access is noted. Then, when it is necessary to bring in a new page of information, the cache page that has gone the longest time without use (or some approximation of this) will be located. One such approximation method is to add to a counter within a page whenever that page is accessed. At intervals, the counters can be checked; any counter having a zero value has not been used in that interval. Once the unused pages have been located, the counters can be reset to zero for a new interval. Any available pages that have been modified will be written back to storage, then the space reused for the new page.

Multiprocessors

Large computers can be formed using multiple processors that divide the work between themselves. FIG. 1 demonstrates a typical arrangement of two multi-chip modules MCM0, MCM1, which between them contain eight processors CPU0–CPU7 and sixteen memories MEM0–MEM15. These multi-chip modules are connected together to form a multiprocessor system.

It is known that access between a processor and an on-chip memory is faster than between the processor and a memory on another chip, e.g. access from CPU4 to MEM11 is faster than access from CPU4 to MEM0. However, it is also known that most accesses to the cache memory are fairly random access. It has been recognized that it would be extremely difficult to provide any optimization of memory use in such a shared memory environment.

FIG. 2 demonstrates a prior art physical distribution of the pages that are allocated to three different cache classes in a shared operating system cache memory, which is distributed across the various memories on the two multi-chip modules. The memory is separated into regions, the exact nature of which is determined by the memory dynamics of the system. For a segmented architecture, such as Advanced Interactive eXecutive (AIX), the regions can be segments. AIX is a version of UNIX, available from International Business Machines Corporation. As can be seen in this figure, cache class CC0 has four pages of cache memory allocated in Region 0xF0, three pages of cache memory allocated in Region 0xF1, and one page of cache memory allocated in Region 0xF2. The other two cache classes CC1, CC2 are likewise spread across the three regions. When any of these cache classes needs to synchronize (i.e., to write back to disk any pages that have been changed) or to locate the least recently used page to replace, it will need to search within three different regions of memory to find all the available pages.

When accessing an address within a segment in the segment-based architecture of AIX, the effective address used by software must be translated into the real address used by hardware. Because this requires several clock cycles, a number of the most recently accessed addresses are stored in the segment-lookaside-buffer (SLB). The SLB can be associatively searched (i.e., all at once), and if the address is found, clock cycles are saved in translating the address. However, an SLB miss results in the need to calculate the necessary address. If the cache spans a considerable number of segments, any other threads accessing the cache during the synchronize operation will cause context switching and require more SLB loads, incurring a penalty for the LRU/synchronize operation. A filesystem synchronize operation, for instance, may end up visiting most of the memory in the cache and may be context switched many times, losing the association of what segments it already visited.

Therefore, it would be advantageous to have a method, apparatus, and computer instructions to synchronize the cache without incurring the high overhead.

SUMMARY OF THE INVENTION

The present invention presents a method, apparatus, and computer instructions in which a cache class in a software-administered cache is assigned cache space that is localized to a single region of a memory, both physically and virtually, and is contiguous. Synchronization and LRU operations can step sequentially through the given region, removing the need for SLB searches or the penalty for a miss, while other threads remain random access. The threads that manage each virtual memory area can then be attached to specific processors, maintaining physical locality as well.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 2:
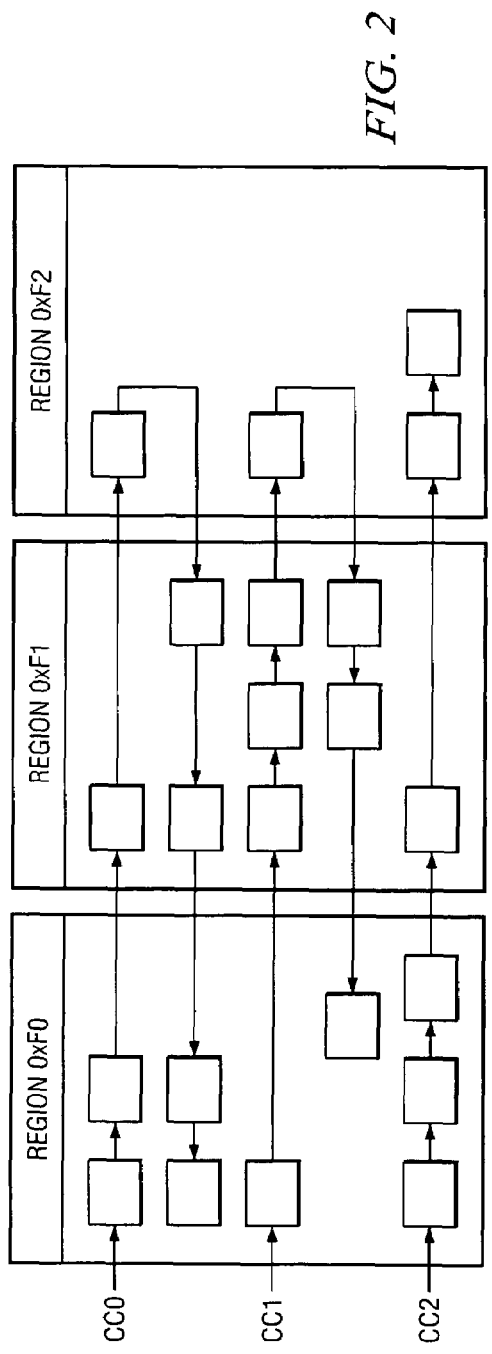
FIG. 2 demonstrates a prior art distribution of cache memory for three cache classes.
Figure 3:
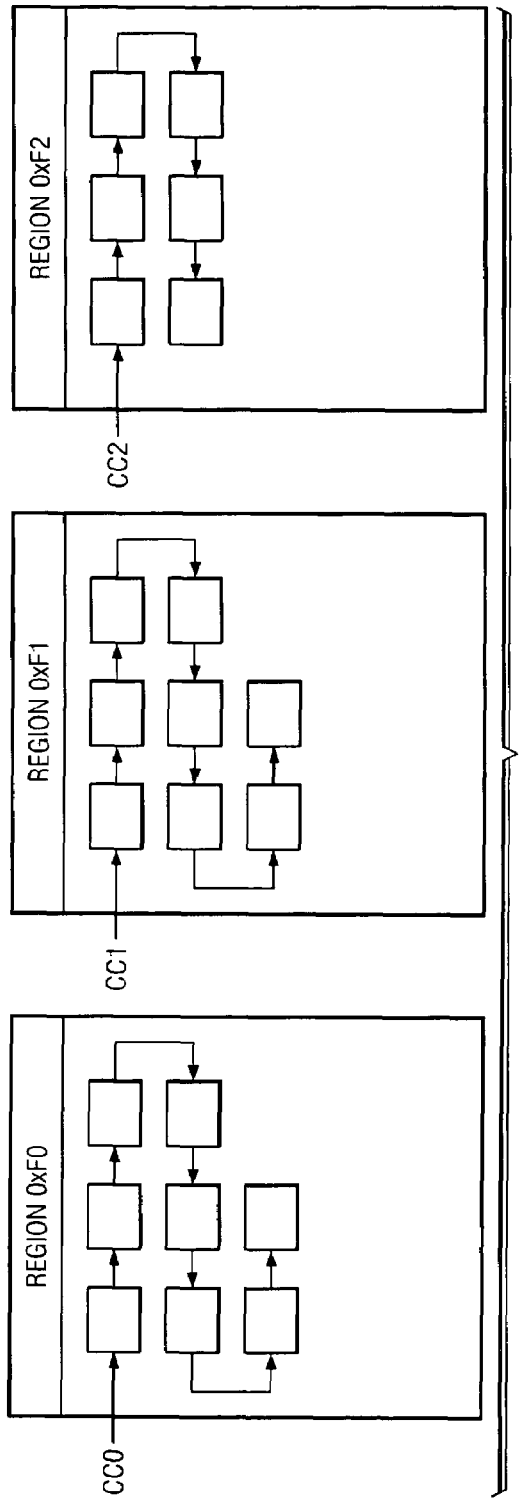
FIG. 3 demonstrates a distribution of cache memory for three cache classes according to a preferred embodiment of the invention.

With reference now to the figures, and in particular, reference to FIG. 3, a diagram demonstrating the allocation of operating system cache memory is depicted according to an exemplary embodiment of the present invention. In this figure, each of the cache classes CC0, CC1, CC2 have the same amount of cache memory available to them as in FIG. 2, but rather than being scattered across the three regions of cache memory, CC0 is completely contained within region 0xF0. Likewise, CC1 is contained within region 0xF1; and CC2 is contained within region 0xF2. In the presently preferred embodiment, the pages of virtual memory given to each cache class are contiguous memory. Then, whenever the least recently used page must be located or the pages synchronized, a thread spawned by the operating system can step through the allocated region sequentially without the overhead of SLB accesses.

EXAMPLE

Inode Cache

Figure 1:
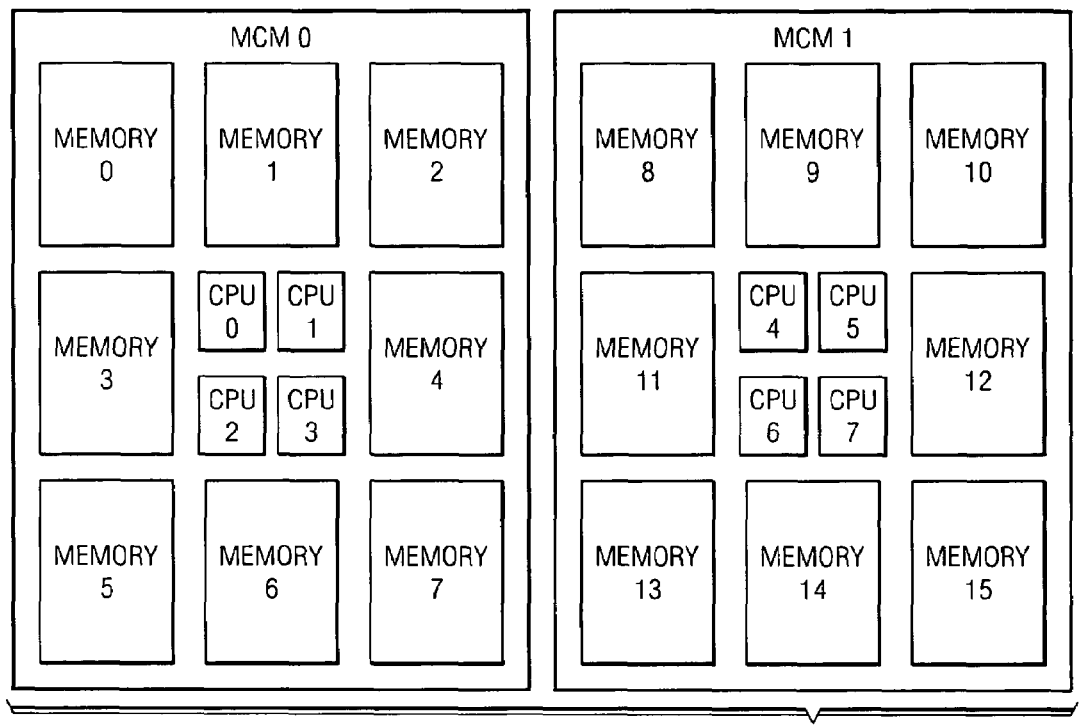
FIG. 1 demonstrates a known physical distribution of processors and memory on a typical multi-chip module in which the invention can be implemented.
Figure 4:
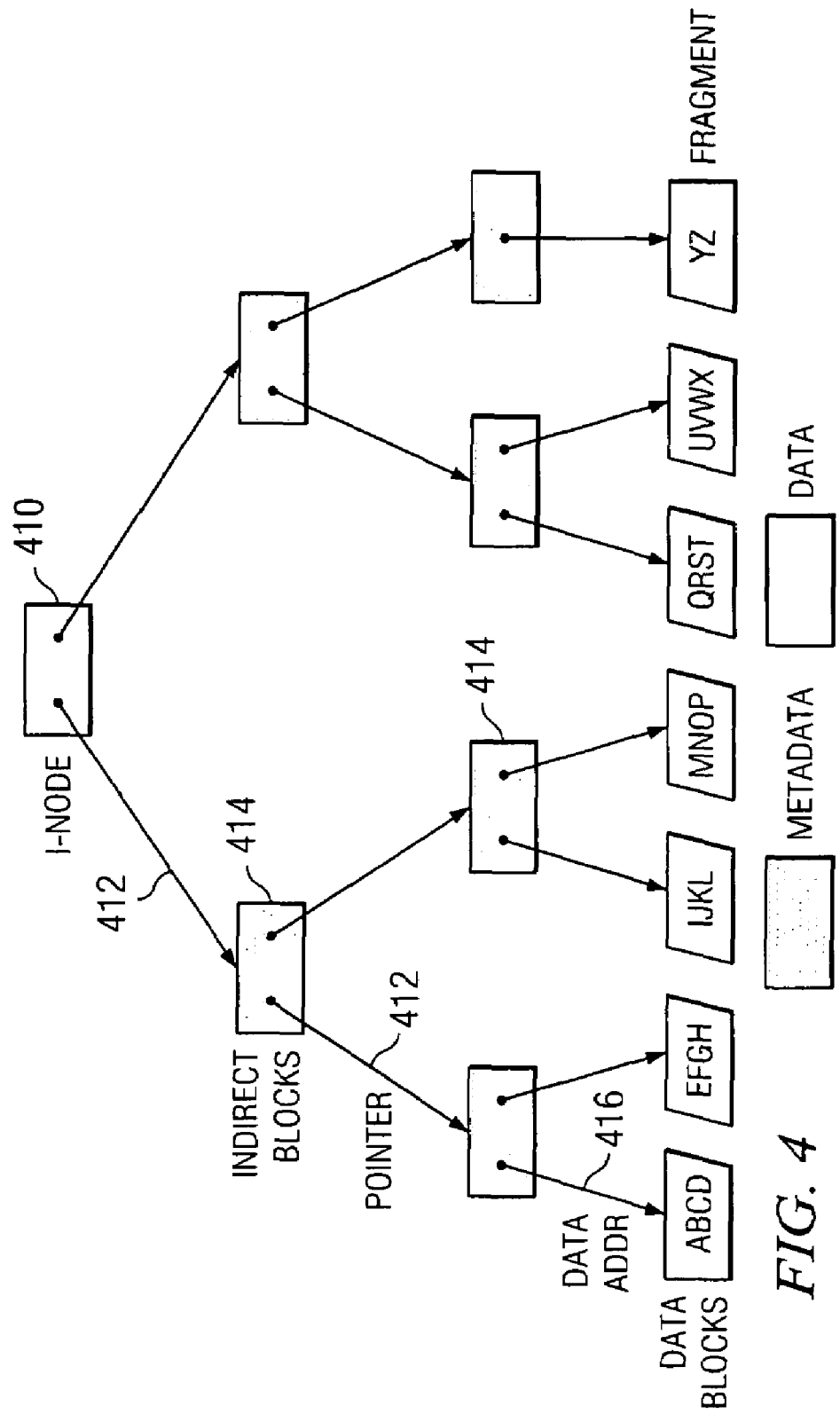
FIG. 4 shows an exemplary inode structure in accordance with a preferred embodiment of the present invention.

In this illustrative example, an AIX operating system is running on the multichip modules MCM0, MCM1 of FIG. 1. For each file stored on the multichip modules, there is an inode, giving information such as file size and time of last modification. FIG. 4 shows an exemplary structure of a single file inode 410, in accordance with a preferred embodiment of the present invention. The inode 410 contains, in addition to information regarding the entire file, either (a) pointers 416 to the addresses of all disk blocks 418 that comprise the file data or (b) pointers 412 to one or more levels of indirect blocks 414 that are deep enough to hold all of the data block addresses. As files are used, their inodes are being continually read and, in some cases, written. The operating system maintains an inode cache to speed up accesses to all of the files. If an inode is found in the cache, a count associated with the inode is incremented to show that it has another user. If the inode is not located in the cache, another location must be freed up so that the operating system can read the inode from memory. Inodes that have a usage count of zero are not currently being used and thus are candidates for reuse. Once a candidate for reuse has been located, the resident inode is written back to disk, if it has changed, then the space is made available. A routine is then called to read the new inode from the file. To get the node that is actually needed, the file system may need to access several other nodes in this tree before reaching the needed node. Thus, more than one free page may be needed.

Figure 5:
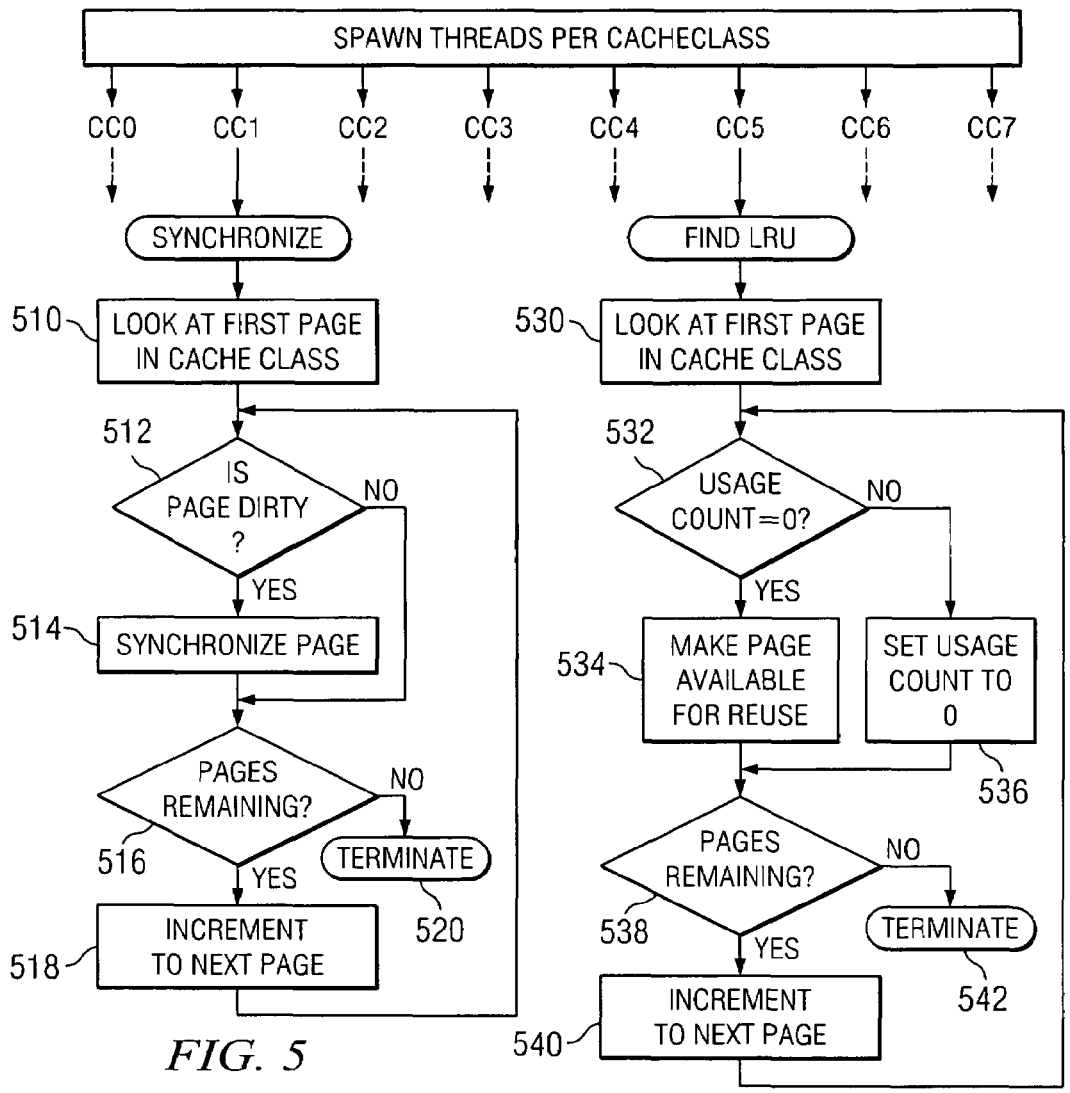
FIG. 5 demonstrates how the LRU-locating and synchronizing threads can be run independently for each cache class or synchronously and shows the flow of these threads according to an exemplary embodiment of the invention.

With reference now to FIG. 5, the illustrative example has eight cache classes CC0, CC1, CC2, CC3, CC4, CC5, CC6, CC7. It will be recognized that respective threads can be launched to search any one of the cache classes CC0, CC1, CC2, CC3, CC4, CC5, CC6, CC7, either independently or simultaneously. Alternatively, a single thread can search each cache class's location in turn. Whenever a thread is spawned to synchronize a cache class, the thread will follow the flowchart shown under CC1, in which the thread starts at the beginning of the cache class allocation(step 510). The thread will check to see if the page is dirty (step 512). A "dirty" page is one that has been changed; a dirty page will be synchronized or written back to the disk (step 512). The thread checks to see if there are more pages or if it has reached the end of the cache class allocation (step 516). If there are remaining pages, the thread will increment to the address of the next page (step 518) and continue checking pages (return to step 512); if no further pages remain on the list, the thread terminates (step 518). Similarly, the flowchart under CC5 demonstrates the flow for searching for the LRU pages. The thread in this flow first moves to the first page of the cache class' allocated space (step 530). The usage count for the page is checked (step 532). If the usage count is zero, the page is available for reallocation and the operating system is so notified (step 534). If the usage count is greater than zero, it will be reset to zero (step 536) to start a new period. The thread checks to see if any pages remain (step 538). If there are further pages, the thread will increment to the address of the next page (step 540) and continue (return to step 532).

Binding Threads to Domains

Localizing the memory allocated to a cache class also allows the cache class to be optimized in terms of physicality. Since the cache memory allocated to the cache class will all be located within a single region of memory, it is easy to be sure that the thread that synchronizes and releases pages within the cache class is localized or bound to a CPU near the physical memory location. Specifically, the processor that synchronizes and releases pages within the cache class should be bound to a processor that is physically located on the same multi-chip module as the memory containing the cache class.

Figure 6:
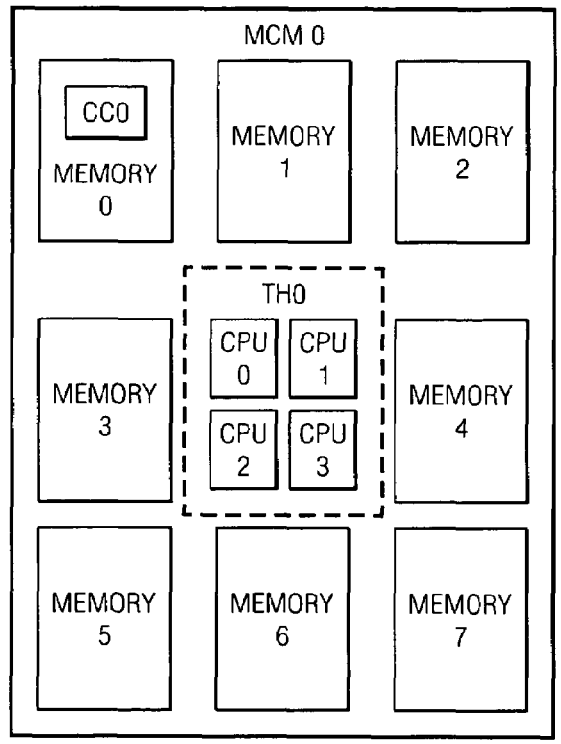
FIG. 6 demonstrates the physical locality of a cache class bound to a memory and of a thread handling that cache class that is bound to a processor according to a preferred embodiment of the invention.

Even though the synchronization thread in this example is bound to a local processor (i.e., one sharing the chip with the cache memory), other types of access, being random, are not bound to a local processor. FIG. 6 demonstrates that the cache class CC0 has been physically located on MEM0. Although the inodes stored in CC0 can be accessed by any of the CPUs, the thread that will synchronize CC0 would preferably be bound to one of the processors on MCM0. For all other types of accesses, the inodes in CC0 can be accessed by any of the processors, including those processors on the module MCM1.

While this example has been explained in terms of an operating system inode cache, the invention is not limited to this example. Rather, the invention is applicable to any cache that is maintained by software (rather than hardware) and needs to be scanned frequently.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A multiprocessor system comprising:
   a plurality of processors;
   a plurality of memories associated with and residing on a chip with at least some of said plurality of processors; and
   a software-administered cache located in said plurality of memories, said cache being separated into a plurality of cache classes, cache memory associated with each of said cache classes being located within a single region of a plurality of regions within one of said memories, and each of said plurality of cache classes being allocated a plurality of pages in contiguous memory, wherein a first thread, performing at least one administrative function within said cache, is connected to operate sequentially through the single region.

2. The multiprocessor system of claim 1, wherein said administrative function is a least-recently-used algorithm for one of said plurality of cache classes.

3. The multiprocessor system of claim 1, wherein said administrative function is a synchronizing algorithm for one of said plurality of cache classes.

4. The multiprocessor system of claim 1, wherein a second thread reads said memory randomly.

5. The multiprocessor system of claim 1, wherein said software-administered cache is administered by an AIX operating system and said region is a segment.

6. The multiprocessor system of claim 1, wherein said first thread is always spawned by a processor located on a same chip as a cache memory associated with a first cache class of said plurality of cache classes on which said thread operates.

7. A method of managing a software-administered cache memory in a multiprocessor, comprising the steps of:
   associating a plurality of metadata objects with a first cache class of a plurality of cache classes, wherein cache space for said plurality of metadata objects in said first cache class is administered as a single entity;
   allocating a plurality of pages of software-administered cache memory to said first cache class, said plurality of pages being within a single region of a memory having a plurality of regions, and being in contiguous memory; and
   spawning a thread to sequentially access said plurality of pages of cache memory through the single region for an administrative function.

8. The method of claim 7, wherein said administrative function is a least-recently-used algorithm for said first cache class.

9. The method of claim 7, wherein said administrative function is a synchronizing algorithm for said first cache class.

10. The method of claim 7, wherein other threads acting on said cache class read randomly.

11. The method of claim 7, wherein said software administered cache is a UNIX operating system cache.

12. The method of claim 7, wherein said region is a segment in a segmented architecture.

13. The method of claim 7, wherein a memory containing said region is on the same chip as a processor spawning said thread.

14. A computer program product, comprising:
   a computer readable medium having computer readable program code for managing a software-administered cache memory in a multiprocessor, the computer program product comprising;
   computer readable program code configured for associating a plurality of metadata objects with a first cache class of a plurality of cache classes, wherein cache space for said plurality of metadata objects in said first cache class is administered as a single entity;
   computer readable program code configured for allocating a plurality of pages of software-administered cache memory to said first cache class, said plurality of pages being within a single region of a memory having a plurality of regions, and being in contiguous memory; and
   computer readable program code configured for spawning a thread to sequentially access said plurality of pages of cache memory through the single region for an administrative function.

* * * * *